United States Patent [19]

Damrath et al.

[11] Patent Number: 4,859,740

[45] Date of Patent: Aug. 22, 1989

[54] PARTICULATE MULTIPHASE POLYMERS

[75] Inventors: Volker Damrath, Burscheid; Christian Lindner, Cologne, both of Fed. Rep. of Germany; Hans-Jürgen Kress, Pittsburgh, Pa.; Dieter Wittmann, Krefeld, Fed. Rep. of Germany

[73] Assignee: Bayer Aktiengesellschaft, Fed. Rep. of Germany

[21] Appl. No.: 154,956

[22] Filed: Feb. 10, 1988

[30] Foreign Application Priority Data

Feb. 14, 1987 [DE] Fed. Rep. of Germany ....... 3704657

[51] Int. Cl.$^4$ .......................... C08F 8/00; C08L 83/04
[52] U.S. Cl. .................................... 525/100; 525/106; 525/104; 525/105; 525/106; 525/288; 525/902
[58] Field of Search ............... 525/102, 106, 104, 105, 525/902, 288, 100; 523/201

[56] References Cited

U.S. PATENT DOCUMENTS

| | | | |
|---|---|---|---|
| 3,686,356 | 8/1972 | Scam ................................. | 525/102 |
| 3,691,257 | 9/1972 | Kendrick et al. ................... | 525/106 |
| 3,808,180 | 4/1974 | Owens ................................ | 525/293 |
| 4,276,389 | 6/1981 | Wieder et al. ..................... | 525/100 |

Primary Examiner—John C. Bleutge
Assistant Examiner—Ralph H. Dean, Jr.
Attorney, Agent, or Firm—Connolly and Hutz

[57] ABSTRACT

Particulate, multiphase polymers which have a core (A) and an overlying shell (B) wherein the core (A) is an organic, rubber-like polymer comprising polymerized olefinically unsaturated monomer units having softening point temperatures below 0° C. and wherein the shell (B) is an organopolysiloxane are obtained by producing in a first stage an organic rubber-like polymer in latex form by emulsion polymerization and, in a second stage, the latex particles of the first stage are surrounded with a shell (B) or organopolysiloxane by polymerizing low molecular weight organosiloxanes in the presence of the latex particles of the first stage.

4 Claims, No Drawings

PARTICULATE MULTIPHASE POLYMERS

This invention relates to particulate, emulsified multiphase polymers having a core-shell structure and to a process for their production. The polymer has an organic, rubber-like polymer as its core and a shell polymer of organopolysiloxane.

BACKGROUND OF THE INVENTION

Multiphase polymers such as these core/shell polymers may be used as coating and impregnating materials and also as raw materials for rubber.

Despite their good rubber properties, organic rubber-like polymers of at least one olefinically unsaturated polymerizable monomer show unsatisfactory properties in many fields of application. Disadvantages can be caused above all by their poor resistance to oxygen, water and water vapor and by their unsatisfactory behavior at high and low temperatures.

Organopolysiloxanes are distinguished by a high deflection temperature and by high resistance to low temperatures. They are also resistant to corrosion and water-repellent.

BRIEF DESCRIPTION OF THE INVENTION

It has been found that emulsified, particulate, highly crosslinked, partly crosslinked or uncrosslinked organic, rubber-like polymers can be coated with organopolysiloxanes in such a way that core-shell structures are formed. It has also been found that multiphase polymers such as these show a particularly good combination of properties and may be used as coating and impregnating materials or as raw materials for rubber.

Thus, the present invention relates to particulate multiphase polymers of a core (A), which is an organic rubber-like polymer based on olefinically unsaturated, polymerizable monomers, and a shell (B) which is a homopolymer or copolymer of organopolysiloxanes.

DETAILED DESCRIPTION OF THE INVENTION

The present invention relates to particulate multiphase polymers which have a core (A) and an overlying shell (B) wherein the core (A) is an organic, rubber-like polymer comprising polymerized olefinically unsaturated monomer units having softening point temperatures below 0° C. and wherein the shell (B) is an organopolysiloxane.

The invention also relates to a process for the production of the particulate multiphase polymers which comprises producing, in a first stage and organic rubber-like polymer in latex form by emulsion polymerization and, in a second stage, the latex particles of the first stage are surrounded with a shell (B) of organopolysiloxane by polymerizing low molecular weight organosiloxanes in the presence of the latex particles of the first stage.

The ratio by weight of the core (A) to the shell (B) is preferably from 0.1:99.9 to 90:10 and preferably from 10:90 to 50:50. The multiphase polymers according to the invention have average particle diameters (d$_{50}$) of from 0.05 to 10 μm and preferably from 0.1 to 2 μm. Particularly preferred particle diameters are 0.1 to 1 μm.

The cores (A) according to the invention are an organic rubber-like polymer with softening temperatures (glass temperatures) below 0° C., preferably below −20° C. and more preferably below −40° C., and have average particle sizes (d$_{50}$) of from 0.05 to 2 μm and more especially from 0.09 to 0.5 μm. They may be an uncrosslinked polymer, partly crosslinked polymer or highly crosslinked polymer; particles of at least partly crosslinked polymer are preferred. The core material (A) is a rubber-like homopolymer or interpolymer of at least one olefinically unsaturated polymerizable monomer, more especially from the group of diene monomers, such as butadiene, isoprene, chloroprene; olefins, such as ethylene; vinyl esters, such as vinyl acetate or vinyl propionate; alkyl acrylates, such as ethyl, butyl, hexyl acrylate, which may even be copolymerized with other monomers, such as styrene, acrylonitrile, alkyl methacrylate, acrylic acid, methacrylic acid, acrylamides, α-methyl styrenes, to form a rubber-like polymer. Preferred core materials are olefin rubbers or alkyl acrylate rubbers.

The material of the shell (B) is a homopolymer or interpolymer of organosiloxanes which are essentially made up of units corresponding to the following general formula $$R_n SiO_{\frac{4-n}{2}} \tag{I}$$

in which R is a monofunctional organic radical and n has an average value of from 1 to less than 3.

R may be a monofunctional saturated hydrocarbon radical containing from 1 to 18 alkyl carbon atoms, for example methyl or ethyl, or R may be an aryl having six to twelve carbon atoms, for example phenyl. In addition, R may also be a monofunctional, radically attackable hydrocarbon radical, more especially vinyl, allyl, chloroalkyl, mercaptoalkyl, acryloxypropyl, etc. Preferably, at least 80% of all the radicals R are methyl groups.

The present invention also relates to a process for the production of the multiphase polymers according to the invention.

An emulsion of the core material (A) is prepared in a first stage:

The core material (A) is produced in known manner by dispersion polymerization of at least one monomer, more especially by aqueous, radical emulsion polymerization. In this process, monomers are polymerized in emulsion in the presence of surface-active compounds and, optionally, initiators. The particle sizes of the polymers may be controlled and adjusted as required by variation of the polymerization conditions. The emulsion polymerizations are normally carried out at temperatures of from 10° to 100° C. Preferred emulsions containing the cores (A) according to the invention have a pH value below 7 and are prepared using anionic emulsifiers, more especially based on salts of sulfonic acids or organic sulfates. The particle sizes of the latices accumulating may be controlled by establishing certain monomer:emulsifier:water ratios. If the cores according to the invention are at least partly crosslinked, the monomers forming the core may be polymerized in the presence of at least one polyfunctional vinyl or allyl monomer, more especially in quantities of up to 5% by weight, based on the monomers. Crosslinking, polyfunctional monomers such as these are well known and include, for example, divinylbenzene, bisacrylates, bisacrylamides, acrylic acid vinyl ester, triallyl cyanurate, isocyanurate, phosphate, citrate, butadiene, isoprene.

In the second stage of the process according to the invention, the organopolysiloxane for the shell (B) is prepared by emulsion polymerization in the presence of the polymer emulsion of the first stage by dispersing low molecular weight organosiloxanes in the latex from stage 1 and polymerizing the resulting dispersion (optionally in the presence of an emulsifier and a catalyst in the quantities necessary to obtain a stable emulsion). There is no need for the coarsely dispersed organosiloxanes to be emulsified before polymerization using such technical aids as, for example, high-speed stirrers (Ultraturrax), colloid mills or high-pressure homogenizers. Instead, emulsification and polymerization preferably take place at the same time. In this way, the organopolysiloxane formed is surprisingly polymerized in accordance with the invention onto the core material (A) produced in the first stage. To increase the polymerization velocity, the reaction temperature may be increased to around 40° to 100° C.

The particle sizes of the multiphase polymers according to the invention may be controlled and adjusted as required by variation of the polymerization conditions. The particle sizes of the multiphase polymers may be controlled particularly effectively by using nonionic co-emulsifiers and establishing certain emulsifier:organosiloxane ratios and also by selecting core materials having suitable particle diameters.

On completion of polymerization, the particulate multiphase polymer may be obtained in modified form by breaking the emulsion in any known manner for example by addition of salts, such as sodium chloride, by evaporation of the water or by addition of water-soluble alcohols, such as methanol, ethanol or isopropanol. If the emulsion is broken by addition of salts or alcohol, the multiphase polymer is obtained in substantially catalyst-free form. However, the multiphase polymer may also be further processed in emulsion.

Suitable organosilicon starting compounds are the compounds known from the prior art, including above all organosiloxane oligomers, such as for example octamethylcyclotetrasiloxane or decamethylcyclopentasiloxane. Alkoxysilanes or alkoxysiloxanes in which the alkoxy group should contain from 1 to 4 carbon atoms are also suitable.

Examples of suitable alkoxysilanes are methyl triethoxysilane, 3-aminopropyltrimethoxysilane and 3-mercaptopropylmethyl dimethoxysilane.

Polysiloxanes, more especially α-ω-polysiloxane diols, having a molecular weight in the range from 2000 to 5000 and a viscosity of from 50 to 150 mPa.s at 25° C. are also suitable for the process according to the invention.

The organopolysiloxane of the shell (B) may be partly crosslinked. Branches or crosslinks may be incorporated by addition of, for example, tetraethoxysilane or of a silane corresponding to the following general formula $$RSiX_3 \quad (II)$$

in which X is a hydrolyzable group, more especially the alkoxy radical. R is as defined above and preferably represents methyl or phenyl. However, crosslinking may also take place if, for example, vinyl and mercapto groups used at the same time react with one another during the emulsion polymerization of the siloxane constituents, so that there is no need for an external crosslinking agent to be added. The organopolysiloxanes of the shell (B) may additionally contain inorganic fillers, such as for example $SiO_2$, talcum and the like.

Suitable emulsifiers are the nonionic and/or anionic emulsifiers known from the prior art.

Examples of nonionic emulsifiers are adducts of ethylene oxide with compounds containing acidic hydrogen, such as fatty alcohols, fatty acids and the like. The HLB value of the emulsifiers should be selected so that it is in the range in which the formation of O/W emulsions is promoted. Emulsifiers having an HLB value of ≧10 are generally used. Suitable nonionic emulsifiers are, for example, POE (3) lauryl alcohol, POE (20) oleyl alcohol, POE (7) nonylphenol or POE (10) stearate. The method of expression POE (3) lauryl alcohol signifies that three units ethylene oxide are added onto one molecule lauryl alcohol, the number 3 being an average value.

Suitable anionic emulsifiers are the alkali salts of fatty acids or the alkali, alkaline-earth or amine salts of organic sulfonic acids, more especially alkyl arylsulfonic acids. Examples are the sodium salt of dodecylbenzenesulfonic acid or lauryl sulfonic acid. It is of course also possible to use mixtures of nonionic emulsifiers with anionic emulsifiers.

As in the prior art, acids are used as catalysts. Surface-active acids are particularly suitable. Examples of catalysts such as these are sulfonic acids, such as the alkylsulfonic acids or alkyl arylsulfonic acids, for example dodecylbenzenesulfonic acid. Although it is possible in principle to use any of the acids known from the prior art as catalysts, it is preferred to use the surface-active acids.

In the polymerization of the shell (B), the formation of new particles should be completely avoided. The emulsion stabilizer must be present in a quantity sufficient to cover the surface of the particles. The size of the particles may be varied within wide limits according to how the reaction is carried out. If an agglomerated latex is used as the core (A) to obtain large particles, these particles may contain several rubber particles. The polymerization of the shell (B) may also be conducted in such a way that core-shell particles and particles of pure organopolysiloxane are simultaneously produced. It is also possible in certain circumstances to use mixtures.

The particulate multiphase polymers according to the invention may be used as coating and impregnating materials and as rubbers. They are also suitable for the production of latex paints. For example, the emulsion may be mixed with pigments and/or other fillers and applied to surfaces on which a coherent film remains behind after evaporation of the water.

The multiphase polymers according to the invention are distinguished by a surprisingly good combination of technically relevant properties as plastics materials and, in addition, may be used instead of pure organopolysiloxane. The properties in question include ageing and thermal stability, low-temperature toughness, resistance to oxidation and corrosion and also high economy.

The invention is illustrated by the following Examples.

EXAMPLES

1. Production of the Core Materials (1.1) 10,300 parts water, 5 parts Na salt of $C_{14}$–$C_{18}$ alkylsulfonic acids, 800 parts n-butyl acrylate and 4 parts triallyl cyanurate are introduced into a reactor.

After heating to 70° C., polymerization is initiated while stirring by addition of a solution of 30 parts potassium peroxodisulfate in 100 parts water. The following solutions are then introduced into the reactor over a period of 5 hours at 70° C.:

Solution 1:
9150 parts n-butyl acrylate
46 parts triallyl cyanurate

Solution 2:
7000 parts water
200 parts Na salt of $C_{14}$–$C_{18}$ alkyl sulfonic acids Polymerization is then completed over a period of 4 hours at 70° C. A latex is obtained which has a solids content of 35.9%, a pH value of 3.2 and an average particle size ($d_{50}$ value) of 0.18 μm. The polymer is partly crosslinked and has a gel content of 89%, as measured in DMF.

(1.2) 9200 parts water, 120 parts Na salt of $C_{14}$–$C_{18}$ sulfonic acids, 5000 parts butadiene, 10 parts potassium peroxodisulfate and 2 parts ethylenediamine tetra-acetic acid, Na salt, are introduced under nitrogen into a reactor. Polymerization is carried out for 25 hours at 60°–65° C., giving a latex which has a solids content of 35%, an average particle size of 0.11 μm and a pH value of 3.7.

2. Production of the Multiphase Polymers According to the Invention (2.1) 150 parts acrylate latex (1.1) and 5 parts octamethyl cyclotetrasiloxane are introduced under nitrogen into a reactor. The reaction mixture is heated to 85° C. and stirred for 2 hours.

After the addition of a solution of 1.3 parts dodecylbenzenesulfonic acid in 139 parts water, the polymerization mixture is stirred for 1 hour at 85° C., after which 95 parts octamethyl cyclotetrasiloxane are introduced over a period of 2 hours.

The polymerization is completed over a period of 24 hours in the initially two-phase mixture, the reaction being carried out with stirring without any reduction in temperature. The stable emulsion formed is cooled to room temperature. It contains the multiphase polymer in a concentration of 36% (as determined in accordance with DIN 53 216).

The particle size is 0.15 μm (as determined by scattered-light laser spectroscopy) and the particle size distribution is monomodal (k 2=0.04).

The polymer is partly crosslinked and has a gel content of 33% (as measured in THF) and consists of 34% acrylate rubber and 66% organopolysiloxane. A tacky, soft film showing excellent adhesion to glass may be formed from the emulsion by evaporation of the water.

(2.2) 200 parts acrylate latex (1.1) and 5 parts octamethyl cyclotetrasiloxane are introduced under nitrogen into a reactor. The reaction mixture is heated to 85° C. and stirred for 2 hours.

After addition of a solution of 1.5 parts dodecylbenzenesulfonic acid and 1.5 parts $C_{12}$–$C_{14}$ alkylsulfonic acid, sodium salt, in 125 parts water, the mixture is stirred for 1 hour at 85° C. A mixture of 95 parts octamethyl cyclotetrasiloxane and 2.5 parts tetramethyl tetravinylcyclotetrasiloxane is then added over a period of 2 hours, polymerization is completed in the same way as in Example 2.1 and the stable emulsion formed is cooled to room temperature. It contains the multiphase polymer in a concentration of 36%. The particle size is 0.15 μm and the particle size distribution is monomodal (k 2=0.02). The polymer is partly crosslinked and has a gel content of 87%.

It consists of 40% acrylate rubber and 60% organopolysiloxane. A tack-free, translucent film showing excellent adhesion to glass may be formed from the emulsion by evaporation of the water.

What is claimed is:

1. Particulate, multiphase polymers which have a core (A) and an overlying shell (B) wherein the core (A) is an organic, rubbery polymer comprising polymerized olefinically unsaturated monomer units having softening point temperatures below 0° C. and wherein the shell (B) is an organopolysiloxane.

2. Particulate multiphase polymers as claimed in claim 1, in which the ratio by weight of (A) to (B) is from 0.1:99.9 to 90:10.

3. Particulate multiphase polymers as claimed in claim 1 having average particle diameters of from 0.05 to 10 μm.

4. Particulate multiphase polymers as claimed in claim 1 wherein the cores (A) have an average size of from 0.05 to 2 μm.

* * * * *